United States Patent [19]
Fix, Jr.

[11] Patent Number: 5,735,447
[45] Date of Patent: Apr. 7, 1998

[54] FRICTION WELDING APPARATUS

[75] Inventor: John W. Fix, Jr., Palm City, Fla.

[73] Assignee: The Safe Seal Company, Inc., La Porte, Tex.

[21] Appl. No.: 717,857

[22] Filed: Sep. 23, 1996

Related U.S. Application Data

[62] Division of Ser. No. 191,618, Feb. 4, 1994, Pat. No. 5,558,265.

[51] Int. Cl.$^6$ ............................................. B23K 20/12
[52] U.S. Cl. ............................ 228/114.5; 228/214
[58] Field of Search ........................... 228/114.5, 235.1, 228/2.1, 2.3, 214

[56] References Cited

U.S. PATENT DOCUMENTS

| | | |
|---|---|---|
| Re. 35,116 | 12/1995 | Butler et al. |
| 3,349,982 | 10/1967 | Lipp et al. |
| 3,576,289 | 4/1971 | Funk et al. |
| 3,599,857 | 8/1971 | Loyd et al. |
| 3,610,507 | 10/1971 | Kiwalle ........................ 228/114.5 |
| 3,612,384 | 10/1971 | Loyd et al. ................... 228/114.5 |
| 3,616,980 | 11/1971 | Padilla . |
| 3,635,388 | 1/1972 | Jenkinson et al. |
| 3,704,821 | 12/1972 | Loyd et al. |
| 3,740,827 | 6/1973 | Hunter et al. |
| 3,772,765 | 11/1973 | Ditto . |
| 3,848,793 | 11/1974 | Herman . |
| 3,882,593 | 5/1975 | Lucas . |
| 4,030,658 | 6/1977 | Parrish . |
| 4,087,036 | 5/1978 | Corbett et al. ................ 228/114.5 |
| 4,122,990 | 10/1978 | Tasaki et al. |
| 4,132,340 | 1/1979 | Kucklick . |
| 4,213,554 | 7/1980 | Sciaky . |
| 4,247,346 | 1/1981 | Maehara et al. |
| 4,593,848 | 6/1986 | Hochbein . |
| 4,702,405 | 10/1987 | Thomson et al. |
| 4,735,353 | 4/1988 | Thomson et al. |
| 4,811,887 | 3/1989 | King et al. |
| 4,858,815 | 8/1989 | Roberts et al. |
| 5,062,439 | 11/1991 | Butler et al. |
| 5,160,393 | 11/1992 | Snyder . |
| 5,277,744 | 1/1994 | Snyder . |
| 5,378,951 | 1/1995 | Snyder . |
| 5,558,265 | 9/1996 | Fix, Jr. . |

FOREIGN PATENT DOCUMENTS

| | | |
|---|---|---|
| 2105736 | 2/1971 | Germany . |
| 53-97953 | 8/1978 | Japan . |

(List continued on next page.)

OTHER PUBLICATIONS

Friction Welding in Industry, A brief summary of the state of the art by R. Loebner F. Weld. I. from *Welding and Metal Fabrication*, Nov./Dec., 1985, pp. 326–328.

Welding Processes, *Library of Congress Cataloguing in Publication Data*, Cambridge University Press 1977, pp. 290–293.

Friction Welding, *Library of Congress Cataloguing in Publication Data*, Cambridge University Press 1977, pp. 231–240.

Application of State of the Art Portable Friction Welding Equipment, *Second European Conference on Joining Technology Eurojoin 2 Florence 16/18 May 1994*, four pages, Italy.

*Primary Examiner*—P. Austin Bradley
*Assistant Examiner*—Jeffrey T. Knapp
*Attorney, Agent, or Firm*—Mark A. Oathout; Gregory M. Luck

[57] ABSTRACT

A friction welding apparatus and a method for its use is disclosed where the apparatus includes a plurality of interchangeable components including a drive means, an actuator assembly, a support system and a control system, the combination operable to friction weld a workpiece to a valve body. The apparatus features a means to maintain a positive fluid pressure within the weld chamber during burn-off and upset phases. Such a means is provided to keep out explosive gases emitted by one of the members being welded. The apparatus features a means to maintain a positive fluid pressure within the weld chamber during burn-off and upset phases. Such a means is provided to keep out explosive gases emitted by one of the members being welded.

2 Claims, 13 Drawing Sheets

FOREIGN PATENT DOCUMENTS

| | | |
|---|---|---|
| 58-38686 | 3/1983 | Japan . |
| 730513 | 4/1980 | U.S.S.R. . |
| 1006134A | 7/1981 | U.S.S.R. . |
| 1293141 | 10/1972 | United Kingdom . |
| 1297847 | 11/1972 | United Kingdom . |
| 1381147 | 1/1975 | United Kingdom . |
| 2011816 | 7/1979 | United Kingdom .................. 228/114.5 |
| 2-145-489 | 8/1986 | United Kingdom . |
| 86-06665 | 11/1986 | WIPO . |
| 95/21040 | 8/1995 | WIPO . |

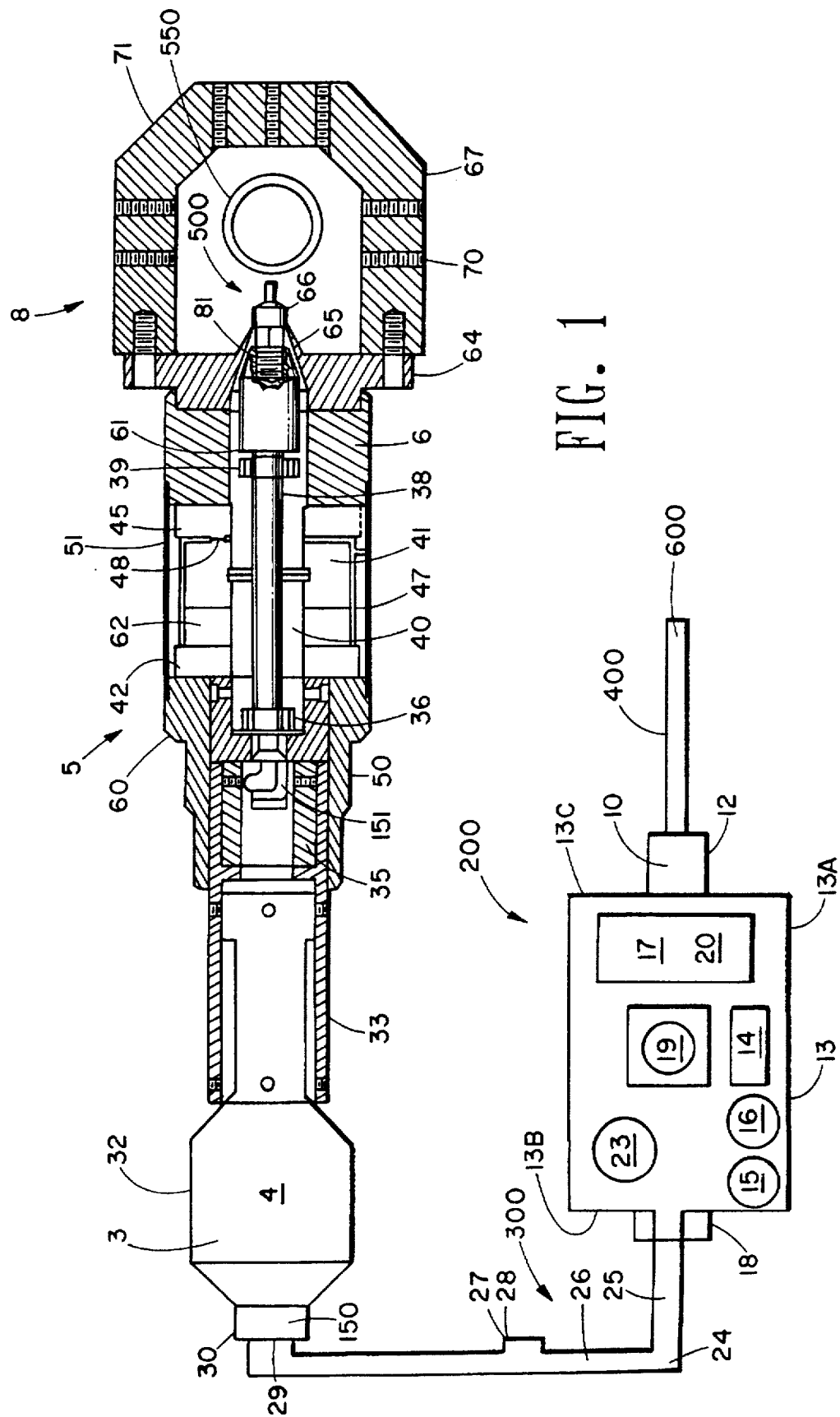

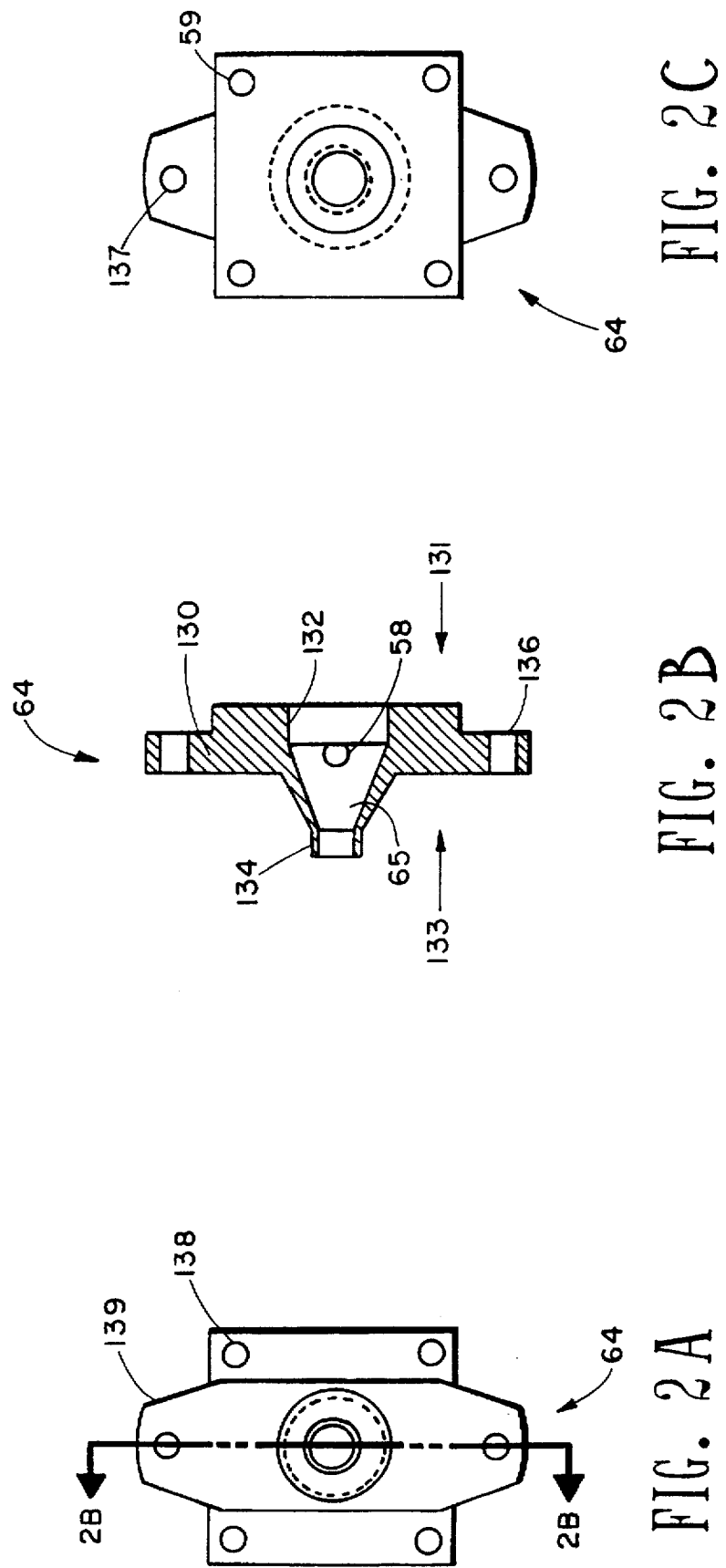

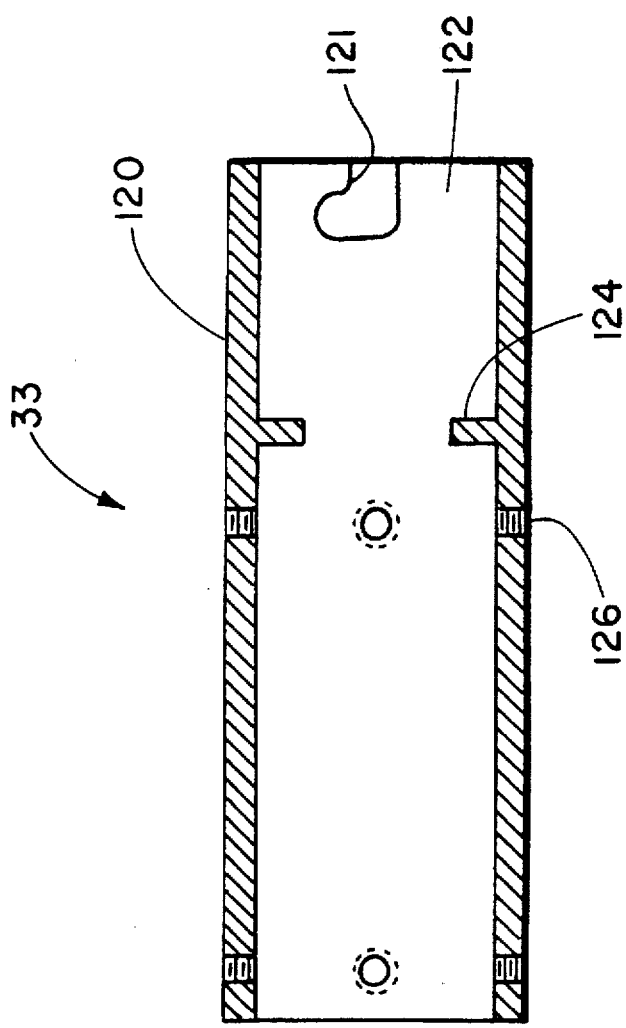
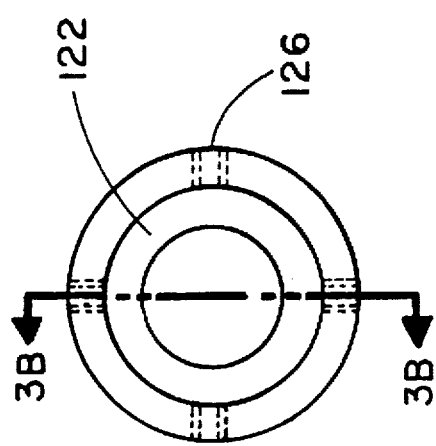
FIG. 3B
FIG. 3A

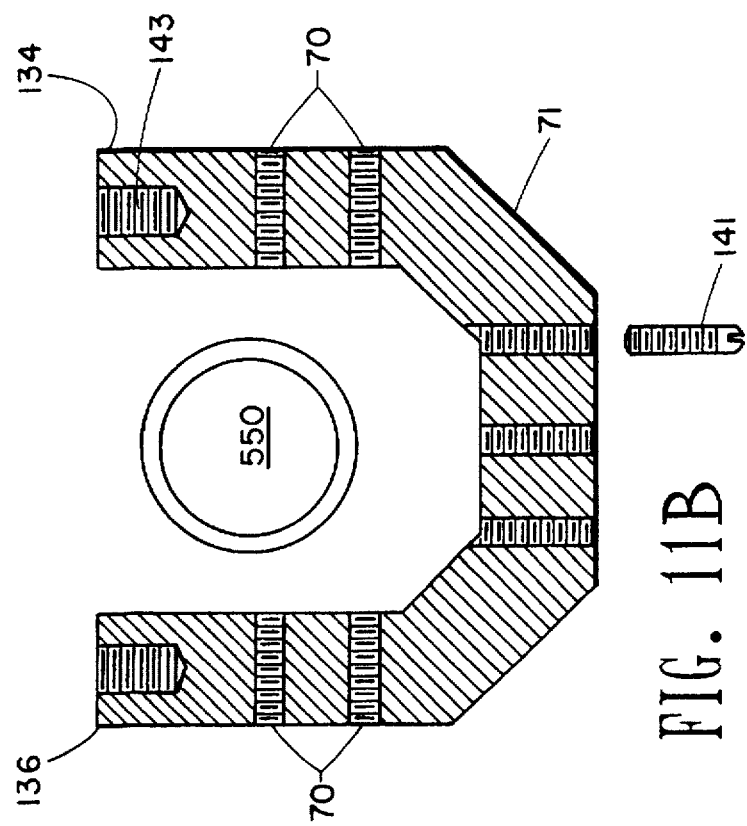

FRICTION WELDING APPARATUS

This application is a division of application Ser. No. 08/191,618, filed Feb. 4, 1994, now U.S. Pat. No. 5,558,265.

BACKGROUND OF THE INVENTION

1. Field of the Invention

The present invention is directed to an improved friction welding apparatus and related apparatus for its use and application in the field. More specifically, the present invention is directed to a portable friction welding apparatus operable via low pressure air sources commonly found in industrial settings, and methods for its use.

2. Description of the Prior Art

In many settings, and especially industrial settings, it is often desirable to attach two members or workpieces via a high strength, fine grain weld. Such a weld is usually performed via a conventional arc or open flame welding procedure. However, in applications where volatile or combustible gases are present, it is not usually possible to use an arc or open flame welding procedure due to the attendant danger of fire or explosion.

One of the solutions proposed to address the above problem includes the use of a friction weld procedure. The friction welding process relies on heat generation between rubbing surfaces to provide a material flux which may be forged to produce an integral bond between the two surfaces. There are generally two recognized methods of supplying energy to form a friction weld: direct drive friction welding, sometimes referred to as "conventional" friction welding, and inertial welding.

In conventional frictional welding, one of the workpieces is attached to a motor-driven unit and rotated at a predetermined, constant speed, while the other member is maintained in a fixed, stationary orientation. When the appropriate rotational speed is reached, the two workpieces are brought together and an axial force is applied. Heat is generated as a result of the friction generated by interface of the respective surfaces, which interface continues for a predetermined time or until a preset amount of upset takes place. Thereafter, the rotational driving force is discontinued and the rotation of the workpiece is stopped. The axial force between the two members is maintained or increased, however, for a predetermined period of time to finalize the weld. The weld product result from a conventional friction weld process is characterized by a narrow heat affected zone, the presence of plastically deformed material around the weld, and the absence of a fusion zone.

A number of disadvantages exist with the direct drive or conventional friction welding process. One such disadvantage is the overall bulk of such a system, since a typical direct drive friction weld apparatus is usually both large and cumbersome. Moreover, conventional friction welding apparatus also typically include complex electronic controls for controlling the different forces which must be applied and for controlling the drive means in a selective manner to monitor relative rotation of the workpieces. In rigorous applications such as those presented in the industrial environment, such electronic controls are often prone to failure. Moreover, the presence of electronic controls requires the presence of an electronic power source which is often times unavailable in the industrial setting.

Yet another problem which occurs with conventional friction welding arises when the two workpieces are initially brought together. At this stage, there is significant initial friction between the workpieces and, therefore, a considerable increase in the energy required to overcome the initial friction. This problem is further complicated in welding rotational workpieces to stationary workpieces due to wide variations in frictional torque throughout the weld cycle. On initial contact of the welding surfaces, there is a relatively high frictional torque which is shortly followed by a requirement for inertial energy which persists until a flux of hot metal is established. However, this energy requirement is temporary in nature and ceases after the resistive torque has been overcome. When the flux is established, the resistive torque falls to a level during the "burn-off" and "upset" phases which may typically be as low as some twenty-five percent of the initial peak torque. During this phase, axial pressure is maintained and the contact surface of both members are carbonized, in the instance of a carbon steel, thereby adding to the flux. This upset phase continues until the driving torque is removed after which time the flux cools, the weld fuses and the resistive torque increases.

The above-noted problems have been addressed in the prior art by the development of drive motors capable of supplying sufficient torque to overcome initial friction forces. Such a drive motor is generally acceptable in relatively stationary friction welding apparatus. However, this proposed use of high power drive motors, due to their large power requirements and weight, are unacceptable to the design of a portable friction weld apparatus.

Inertia friction welding was developed to address the above disadvantages of prior art "conventional" friction welding techniques. Contrasted with conventional friction welding, in inertial friction welding the speed of the rotating workpiece continuously decreases during the friction stages of the procedure. In inertial friction welding, the rotating workpiece is coupled to a flywheel which is accelerated to a predetermined rotational speed. During the weld process, the drive motor is disengaged and the workpieces are forced together in an axial direction. This axial force causes the forging surfaces to rub together under pressure. The kinetic energy stored in the rotating flywheel is ultimately dissipated as heat as a result of friction between the workpieces. As a result of such friction, the speed of the flywheel decreases until stoppage during which time the axial force may be increased or maintained. The total time for the wheel to come to rest depends on the average rate at which the energy is being removed and converted to heat.

Three variables are presented by the inertial welding technique. These include the movement of the inertia of the flywheel, the initial flywheel speed, and the axial pressure between the workpieces. The first two variables dictate the total amount of kinetic energy available to form the weld. The required axial pressure is dictated by the materials to be welded and the interface area. The energy contained within a flywheel is determined by its mass and rotational speed.

One such inertial friction welding apparatus is disclosed in U.S. Pat. Nos. 4,702,405 and 4,735,353 as issued to Allan R. Thomson, et al. The friction welds apparatus described by Thomson is somewhat portable and utilizes a dual drive means where the second drive means includes a flywheel. In operation, the Thomson apparatus utilizes the first drives means to establish a preliminary number of revolutions per minute in the rotating workpiece before it is engaged to the stationary workpiece to which a weld is desired. Upon engagement, the spinning member begins to decelerate at a rate commensurate with the axial load and the initial revolutions per minute. Sufficient rotations of the spinning member, however, are maintained by the energy stored in the flywheel, which energy is hopefully sufficient to maintain rotational movement to overcome the initial frictional forces whereafter the first drives means maintains rotation of the spinning member until the weld is completed.

Disadvantages, however, also exist for the inertial friction weld apparatus described by Thomson. One such disadvantage is the requirement for an extremely high pressure air source and high pressure fluid flow to power the apparatus. Accordingly, the Thomson apparatus is not adapted to use pressurized air sources conventionally found at industrial facilities, but instead must utilize high pressure air supplied by special compressor units which must necessarily accompany the apparatus to the job site. This need for an additional source of pressurized air decreases to a considerable degree the portability of the Thomson system and also enhances the costs and flexibility of its operation. Moreover, the high pressure requirement also enhances the complexity of the architecture of the air motor and thus enhances the overall maintenance requirements of the system.

Other disadvantages include the requirement in the Thomson device for a flywheel to store inertial energy, which flywheel rendering the Thomson apparatus both heavy and bulky.

SUMMARY OF THE INVENTION

The present invention addresses the above and other disadvantages of prior art friction welding apparatus by providing a lightweight, portable apparatus which is able to form a fine grain, forged friction weld by use of pressurized air sources commonly available at industrial facilities.

The friction weld apparatus of the present invention generally comprises a drive means, an actuator component, a clamp assembly and a control means and a method for its use. Unlike conventional and prior welding apparatus, the present invention is not contained within a single housing but instead is componentized with operational integration achieved by unique coupling elements. Such componentization is advantageous because it allows for ease in inspection and replacement of damaged components while other components remain in operation.

In a preferred embodiment, the present invention is fully automatic and thus independent of the operator during the welding process. This offers the benefit of removing the operator from the immediate area of the friction weld itself which, if the procedure includes a leaking valve, may present the potential of a high temperature or noxious environment.

The present invention offers yet other advantages over the prior art in the manner of safety systems. In a preferred embodiment, the control system offers manual emergency shutoff controls and timed shut down for welds exceeding a preset time in the event of a failure of equipment or in the weld itself. Further, the control system of the present invention may be isolated from the air supply connector, thus enhancing the safety and portability of the welding apparatus in welding operations.

Moreover, the present invention is lightweight and operable off of air supply sources conventionally found in industrial facilities, thus enhancing the flexibility of its application.

BRIEF DESCRIPTION OF THE DRAWINGS

FIG. 1 is a cross-sectional view of one embodiment of the friction welder of the present invention and each of its various components as drawn along an axis "A".

FIG. 2 includes multiple views of the upper clamp section of the present invention including a proximal end 2A, a side view 2B and a distal end 2C.

FIG. 3 is a cross-sectional view of one embodiment of a coupling sleeve.

FIG. 11 includes multiple views of the lower support member, including a front view 11A, a top view 11B and a side view 11C.

DETAILED DESCRIPTION OF THE PREFERRED EMBODIMENTS

Figures 4A, 4B:
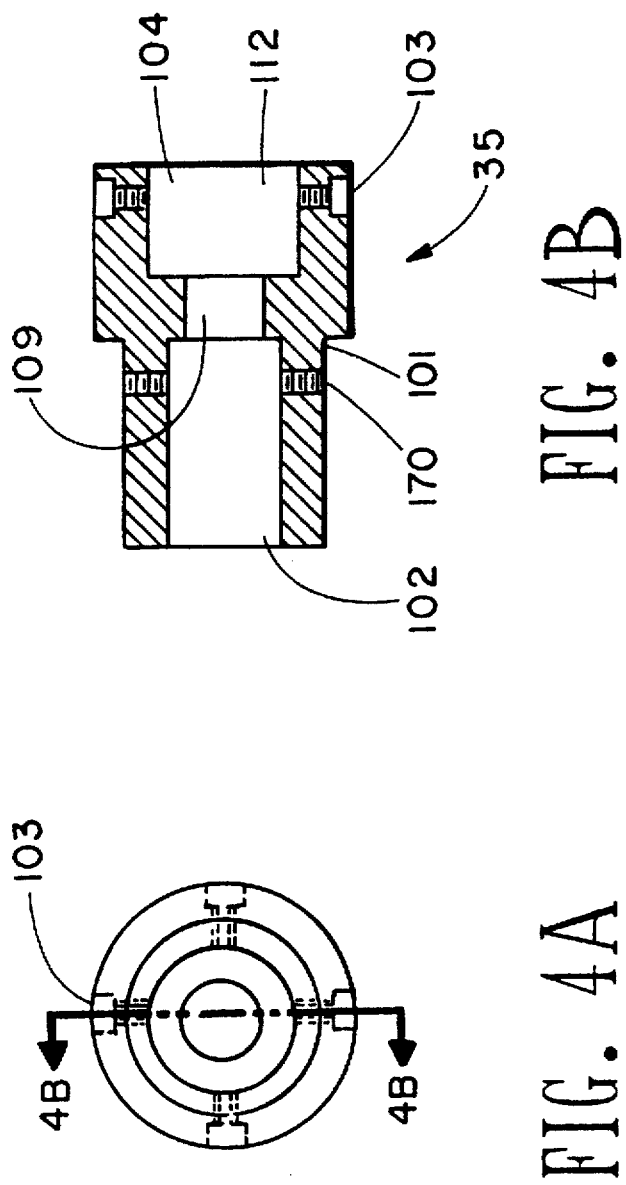
FIG. 4 includes multiple views of one embodiment of a shaft coupling element, including an end view 4A and a cross-sectional view 4B.

The friction weld apparatus 2 of the present invention is set forth at FIGS. 1–12 and generally comprises a drive means 3, an actuator component 5, a clamp component 8 and a control means 200. These components are integrally coupled in a manner described below.

By reference to FIG. 1, drive means 3 preferably includes an air motor 4 which may include a conventional air motor or a modification thereof depending on the horsepower and torque output requirements for the friction weld apparatus as will be discussed herein. Alternatively, other drive and power means, e.g., electrical, mechanical, or hydraulic power sources are also envisioned within the spirit of the present invention. It is desirable, however, that any such alternative power source generate sufficient torque and horsepower and be of a light enough weight as to carry out the objectives of the present invention in a portable friction weld apparatus.

In a preferred embodiment, air motor 4 should generate no less than 0.5 horsepower and 1 footpound of torque, and in a preferred embodiment will generate between 2–3 horsepower and generate some 2–3 footpounds of torque. In order to enhance the overall portability of the system, air motor 4 should weigh no greater than some seven pounds, and preferably some three pounds. In a preferred embodiment, air motor 4 may include an Ingersoll Rand Model No. 88H90 air motor or a comparable power source. Air motor 4 is operable via the pressured air sources ordinarily found at industrial facilities which generally provide air pressure in the range of 90–125 pounds per square inch.

Figure 13:
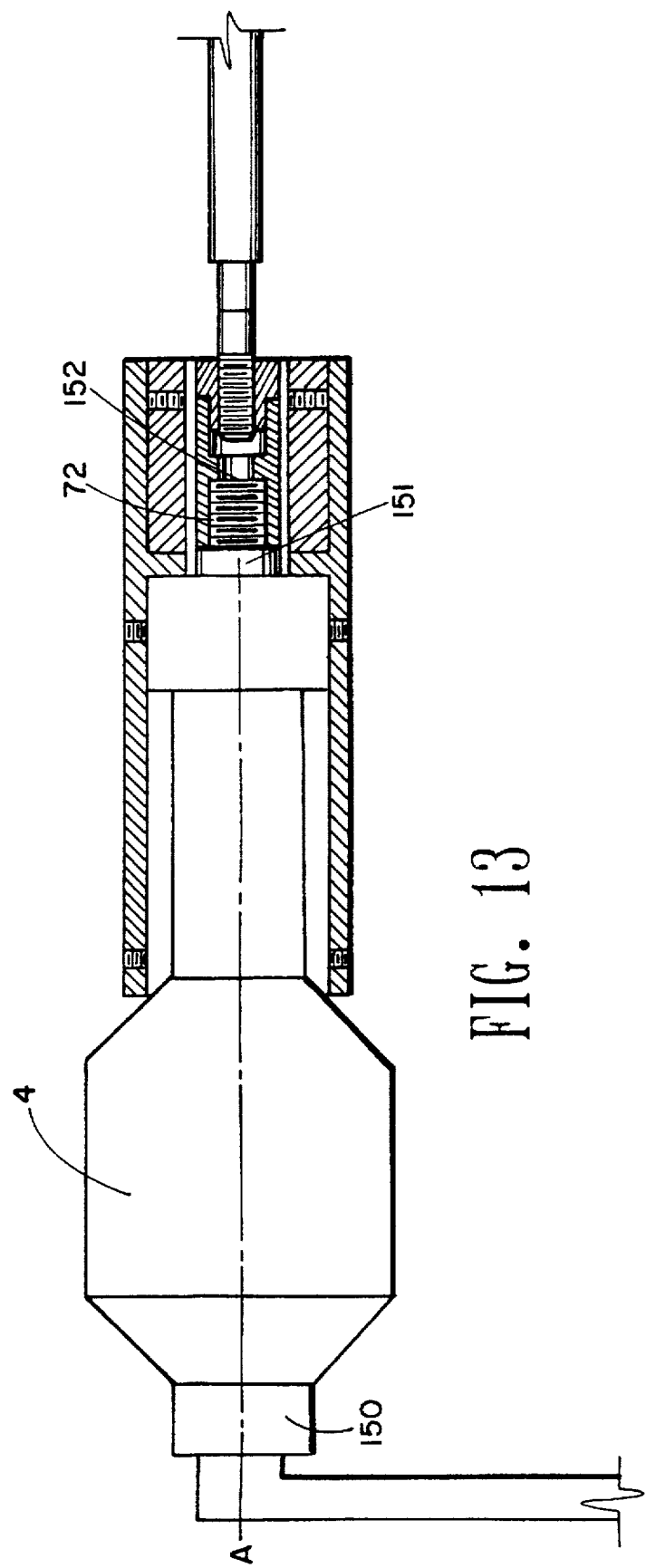
FIG. 13 is a detail view of the air motor and drive shaft.

As illustrated in FIGS. 1 and 13, air motor 4 includes an air inlet 150 at a first or distal end when viewed with respect to a workpiece 500, and a drive shaft 151 oppositely disposed with respect to inlet 150 along a longitudinal axis designated "A". In one contemplated embodiment, drive shaft 151 includes a spindle 72 which in one embodiment may include a terminal threaded end 152.

Air motor 4 is itself disposed within a protective housing 32 which may be formed of one or more components or access panels to allow for ready access and inspection. Housing 32 may be formed of molded aluminum, plastic or other strong, lightweight materials. Housing 32 defines at its distal end a connector 30 receivable to a supply of pressurized air (not shown) via coupling line 300. Coupling line 300 also carries controls to drive means 3 and other components of the apparatus 2 as will be further described herein. In a preferred embodiment, line 300 is provided with a quick disconnect coupling 29 at its proximal end to enable ready attachment and detachment of line 300 from connector 30. Such a quick disconnect feature is desirable in transportation and set up of the apparatus as well as when an emergency disconnect of the power source might be necessary.

Generally stated, actuator component 5 is adapted to translate rotational movement created by drive means 3 as well as produce the necessary forging pressure required to yield an acceptable friction weld between a workpiece 500 and a stationary member 550, e.g., a valve body. As illustrated in FIG. 1, actuator component 5 comprises a housing 60 defining a longitudinal bore 61 therethrough, a sleeve 38 slidably disposed in said bore and responsive to an axial movement means 62, where said sleeve 38 itself defines a bore therethrough in which an actuator shaft 79 is rotatably disposed about a radial bearing 36 and a thrust bearing 39, where bearings 36 and 39 are embedded in sleeve 38.

Figure 6C:
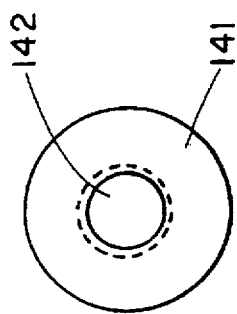
FIG. 6 includes multiple views of one embodiment of the actuator adapter coupler of the present invention including a distal end view 6A, a cross-sectional side view 6B and a proximal end view 6C.
Figure 6B:
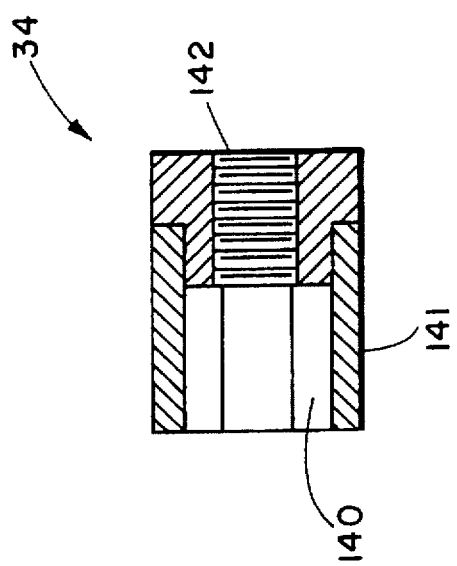
Figure 6A:
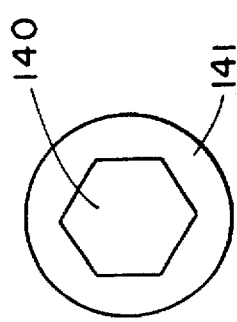

The translation of rotational movement induced by drive means 3 though shaft 151 is accomplished by an actuator adapter coupler 34 as illustrated in FIGS. 1, 6 and 13. The rotation of air motor spindle 72 is communicated to actuator shaft 79 and ultimately to workpiece 500 as will be further described herein. Adapter coupler 34 is slidably receivable in the distal bore 102 of a shaft coupling element 35. (See FIG. 4). Referring to FIG. 6, coupler 34 comprises a cylindrical sleeve 141 defining differing diametrical bores 140 and 142. In a preferred embodiment, bore 140 is disposed in the proximal end of coupler 34 and defines an hexagonal end cross-section slidably receivable to actuator shaft 79 and adapter nut 91 as will be further described herein. In a preferred embodiment, distal bore 142 is threaded to receive the terminal, proximal end 152 of spindle 72.

Air motor spindle 72 is fixedly coupled to actuator 5 via a shaft coupling element 35 as illustrated in FIG. 1 and more specifically at FIGS. 4A–B. Coupling element 35, along with other elements of the coupling assembly as described below, allows for quick connect/disconnect of drive means 3 from actuator 5, and more specifically the drive spindle 72 from actuator sleeve 38. Coupling element 35 preferably includes a cylindrical sleeve 101 defining a multi diameter bore 112 therethrough, said bore 112 receivable at its distal end 102 to coupler 34 as earlier described and at its proximal end 104 to the distal end 38A of actuator sleeve 38. As illustrated, the bore defined at distal end 102 is smaller in diameter than the bore defined at proximal end 104. Bores 102 and 104 are preferably spaced by a smaller diameter bore 109 receivable to the terminal end of shaft 79. Actuator coupling sleeve 38 is fixedly maintained on the proximal end of coupling element 35 via fasteners (not shown) threaded through radially positioned apertures 103. In such a fashion, rotation induced by air motor 4 is translated to shafts 151 and 79, while coupling element 35 and sleeve 38 are maintained in a fixed, nonrotating orientation relative to drive means 3 and actuator 5.

Figure 5B:
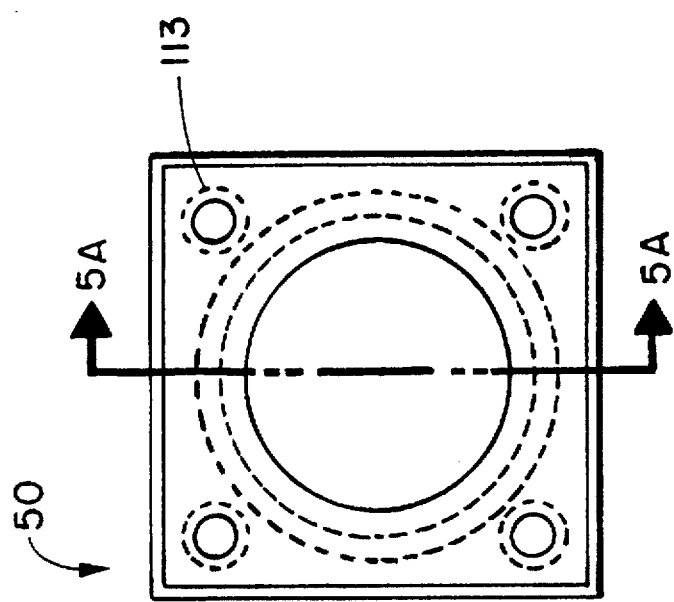
FIG. 5 includes multiple views of one embodiment of an actuator top cover including a cross-sectional view 5A and an end view 5B.
Figure 5A:
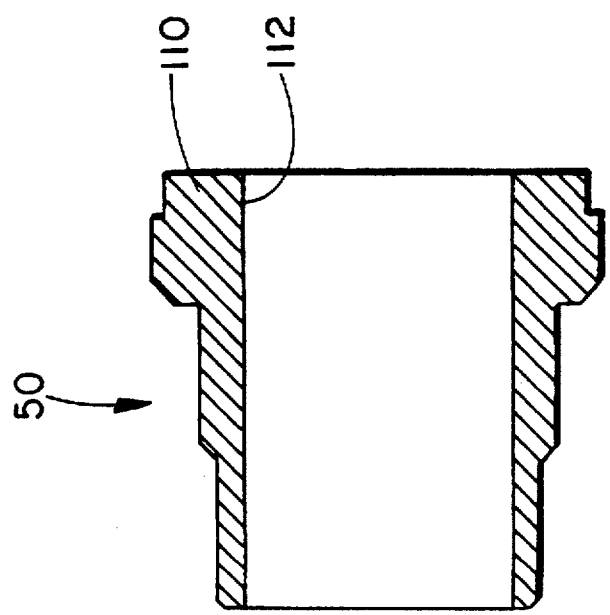

By reference to FIGS. 1, 3 and 5, drive means housing 32 is rigidly held in a spaced relationship vis-a-vis actuator 5 by a coupling sleeve 33 and to a lesser degree by actuator top cover 50. By reference to FIG. 3, coupling sleeve 33 comprises a cylindrical body 170 defining a longitudinal bore 122 therethrough, where the distal end 123 of bore 122 is adapted to slidably receive the proximal end of drive means housing 32 as illustrated in FIG. 1. The longitudinal position of housing 32 within sleeve 33 is maintained by a radial spacer 124. The proximal end 125 of bore 122 is adapted to slidably receive shaft coupling element 35 as described above and as illustrated in FIG. 1. The proximal end 125 of sleeve 33 is also provided with two oppositely disposed, elbow shaped locking grooves 121 receivable to keys threadedly disposed in apertures 170 formed in coupling element 35. In a preferred embodiment, it is desirable that sleeve 33 define a inner diameter closely approximating the outer diameter of the distal end of shaft coupler element 35 so as to ensure a close fit therebetween.

The assembly defined by the combination and interconnection of coupler element 35 and sleeve 33 is slidably receivable within actuator top cover 50. Referring to FIG. 5, top cover 50 comprises a generally cylindrical sleeve 110 defining a longitudinal bore 112 therethrough where said bore 112 has an inner diameter matching the outer diameter of coupler element 35 and sleeve 33, when mated. The connection assembly described above as comprised of coupler element 35, coupler sleeve 33, top cover 50 and adapter coupler 34 allow for the ready coupling and/or removal of drive means 3 and actuator 5 to effect inspection or repair.

Actuator housing 60 is comprised of actuator top cover 50 and a logic block component 6, the combination defining a coaxial ring or cavity therebetween. Cover 50 and logic component 6 in combination with an access plate 51 form a pressurizeable chamber 47 in the aforereferenced cavity to accommodate axial movement means 62. Axial movement means 62 comprises an actuator cylinder or piston 41 slidably disposed within chamber 47 and fixedly coupled to sleeve 38, a series of inlet ports 42 and 45, and a fluid sensing element 48. In the embodiment illustrated in FIG. 1, cylinder 41 is supported by a series of radially spaced, axially disposed tie rods 40 which are coupled at each end to cover 50 and logic block 6. See FIG. 10. Piston 41 is provided with conventional sealing elements, e.g., O-rings about its outer radial diameter to maintain a seal upon its reciprocation within chamber 47. All sliding surfaces are preferably lubricated with a Teflon® based, low friction, long lasting grease to reduce wear therebetween.

In a preferred embodiment, cylinder or piston 41 is maintained in a fixed rotational orientation with respect to chamber 47 during both the burn off phase and the forging period of the friction weld. This is accomplished by the nonrotational interaction between shaft 39 and sleeve 38 as previously described via embedded bearing 36. Maintenance of a stationary, non-rotating orientation of cylinder 41 is also accomplished by a antirotation rod 611 situated inside chamber 47. By reference to FIG. 10, rod 611 is axially disposed between the longitudinal ends of chamber 47 through piston 41. Rod 611 is provided with one or more sealing elements, e.g., O-rings, to preserve the seal on the proximal and distal sides of cylinder 41 to allow each side to maintain a differential pressure. In this fashion, rod 611 mechanically prevents the rotation of cylinder 41 in chamber 47.

As noted, axial movement means 62 enables the formation and maintenance of a selected forging pressure between the workpiece 500 and a stationary member 550, e.g., a valve body. This axial movement and pressure is accomplished as a result of the differential pressure created across the distal and proximal ends of actuator cylinder 41 when chamber 47 is pressurized via inlet ports 42 and 45. When a selected fluid, e.g., air, is introduced into chamber 47 under pressure via inlet 42, pressure is created behind actuator cylinder 41 which is fixedly coupled to sleeve 38. Cylinder 41 is then urged in a axial direction toward stationary member 550. This axial movement initially results in the contact necessary between the workpiece 500 and the stationary member 550 to achieve burn-off and upset, and ultimately achieves the forging pressure necessary to complete the weld. In this connection, the contact pressure and duration can both be closely modulated by the operator or preset as will be further described herein.

When the weld has been completed, air pressure through inlet 42 is terminated. Fitting 7 is then disengaged from the apparatus 2. This may be accomplished manually by decoupling drive means 4 and actuator 5 to expose adapter nut 91. Shaft 79 is then manually turned via nut 91 in a counterclockwise direction to back off chuck 187 from fitting 7. Alternatively, when pressure through inlet 42 is eliminated, air motor 4 may be reversed to disengage fitting 7 from chuck 187 after which time air pressure is then introduced ahead of cylinder 41 via inlet 45 to return piston 41 to its original, retracted position.

In a preferred embodiment, actuator lower end port 45 is provided with a fluidic sensing element 48. Sensing element 48 functions to provide the operator control of the weld to a predetermined upset condition regardless of the material constituting the workpiece and the stationary member, and regardless of the varying times needed to accomplish a fusion weld. Sensing element 48 comprises a detachable cylindrical element which is activated by the closure of actuator cylinder 41. This is accomplished by a disruption of air flowing through sensor 48, which disruption creates an increased signal to control means 200. Fluid flow from the activated sensing element 48 is channeled into logic block component 6 via a connecting passageway (not shown) formed in logic block 6 and operatively coupled to an air pressure source via central means 200 via fluid sensor transducer 363.

Actuator chamber 47 is pressurized by the introduction of air channeled through logic block component 6 vis-a-vis an air supply source 600 as earlier described. Logic component 6 contains fluidic and pneumatic components and includes a number of mechanical fluid passages to provide for sensing, logic, control and purging functions. A cross-sectional view of logic component 6 may be seen by reference to FIG. 8 in which is illustrated a purge hole 355, a check valve 357, e.g., a Clippard Model MCV-1, a pressure release valve 359, e.g., a Clippard Model MAV-3P, a needle valve 361, e.g., a Clippard Model MNV-3P, and a transducer 363, e.g., a Clippard Model 1022. A schematic illustrating fluid flow through logic block 6 is presented at FIG. 12.

Figure 8A:
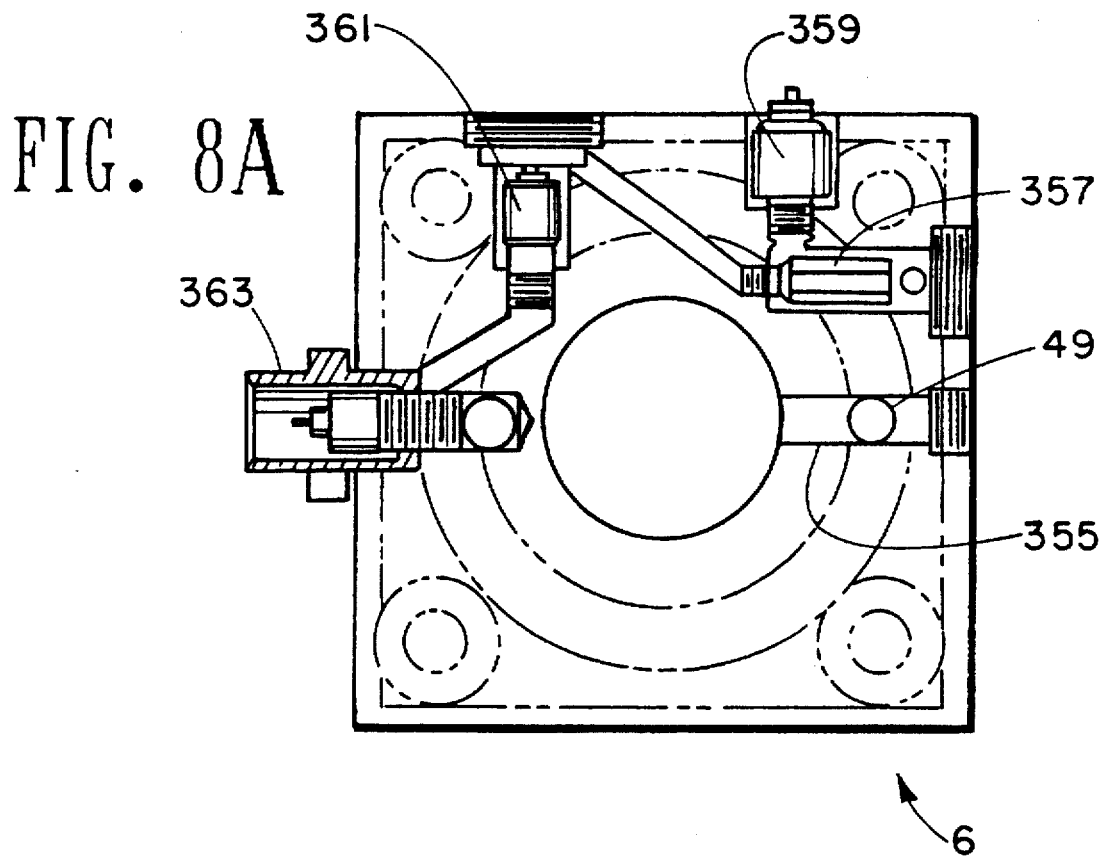
FIG. 8 includes multiple views including end side cross section views 8A and 8B of the logic block component.
Figure 8B:
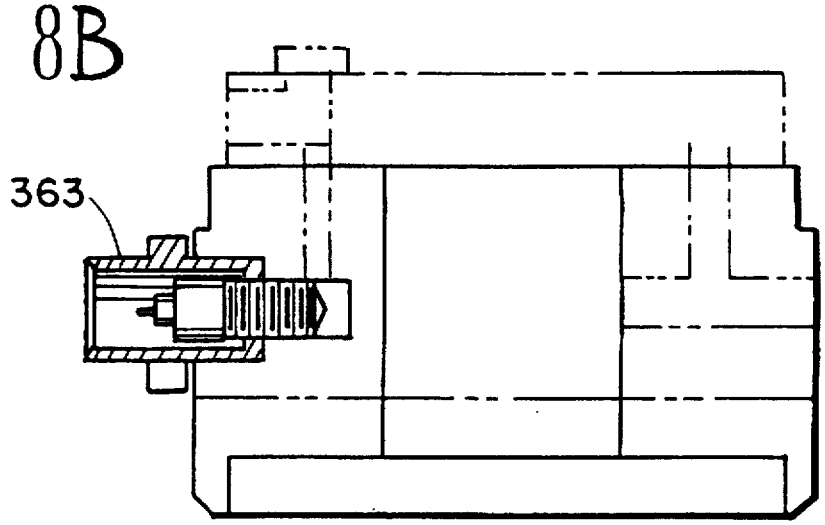

Referring to FIG. 8, transducer 363 provides for interpretation and transmission of the fluid signal generated by sensing element 48, and is designed to provide fluid flow to and from element 48 independent of other fluid control elements located in logic block 6. Transducer 363 provides the pressurized fluid flow required for the sensing and the purging processes while creating a low pressure area at feedback line 26. This area of low pressure is important to avoid the reception of false sensing signals by control means 200. The architecture of transducer 363 is such that low pressure can be achieved during the time fluidic sensing element 48 is inactive by the use of a venturi effect and/or the use of high subsonic or supersonic air flow through a nozzle that creates a low pressure pick up point for line 26 until element 48 is activated. When element 48 is activated, blocked fluid flow interrupts the venturi effect and causes sensing pressure to feedback line 26 to increase to the level required to activate logic system 17 via transducer 14, quick coupling element 54 and other control feedback elements as will be further described herein. Pressure relief valve 359 may be located in logic block component 6 as illustrated in FIG. 8, or may alternatively be located in actuator 5 or other isolated locations. Valve 359 is mechanical-pneumatic in that it is either manually controlled or controlled through automatic control systems as previously described and as will be described in more detail below.

Logic block component 6 also includes a fluidic-pneumatic pressure modulation control system 55 as coupled to line component via logic feedback quick coupling element 54. Control system 55 modulates the fluid flow entering inlet port 45 by first providing a delay time period and then increasing the forging pressure to actuator 5 for a selected duration until a maximum or selected forging pressure is achieved. Control system 55 also provides a mechanism to maintain a selected forging pressure until the friction weld process is completed.

As noted, coupling element 54 is operatively coupled to component 300, logic block 6 and to transducer 52. Logic block component 6 also includes a clamp weld chamber purge pressurization port 49. Port 49 serves to channel fluid flow from inactivated fluidic sensor 48 to clamp component 8 to provide a positive pressure which keeps out explosive gases during the friction weld process. Air flowing from sensor 48 through port 49 passes through passage 355 and into weld chamber 65 via purge port 58, and into the atmosphere, the result being to provide a positive pressure in chamber 65 to keep out explosive gases emitted by member 550.

Figure 7:
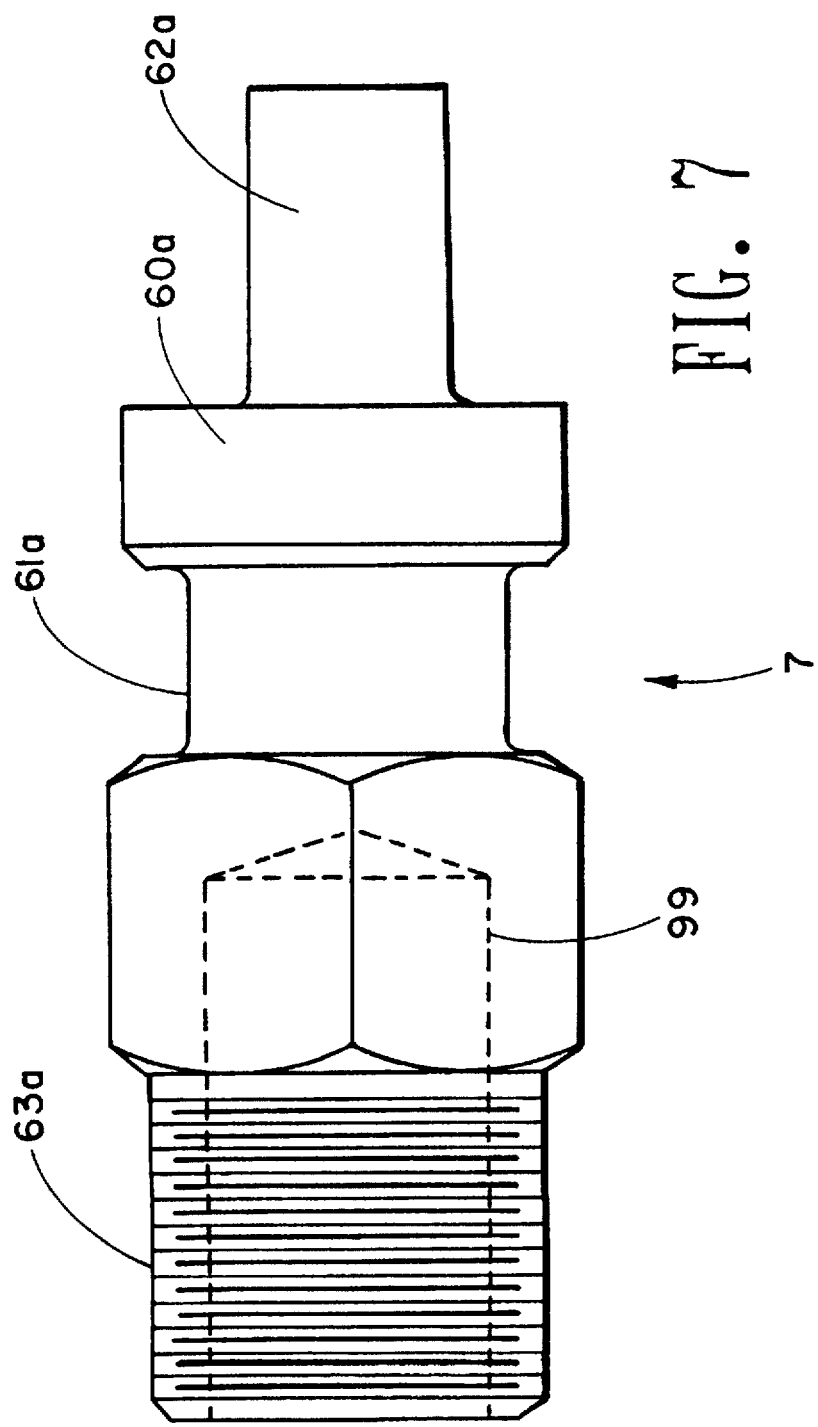
FIG. 7 is a side view of one preferred embodiment of a fitting adapted for use with the present invention.
Figure 9:
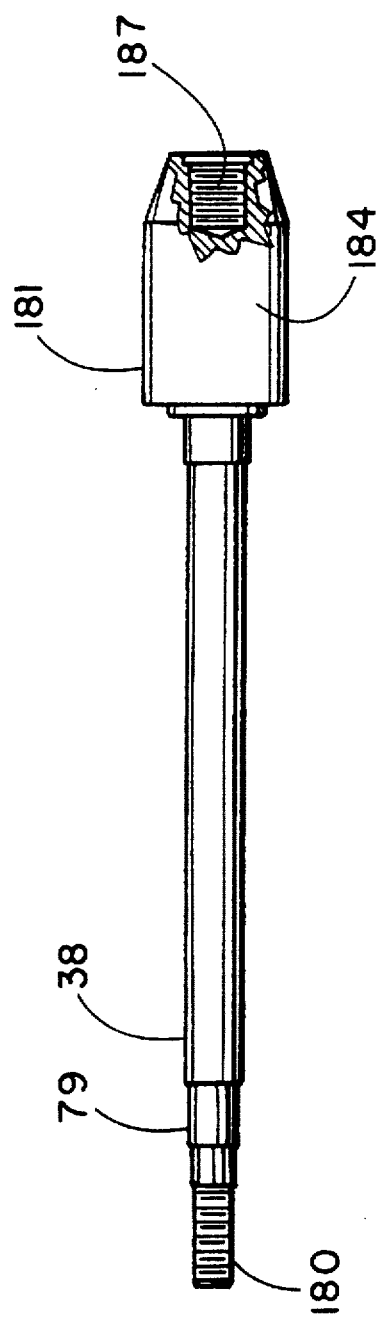
FIG. 9 is an isolated side view of the actuator shaft.
Figure 10A:
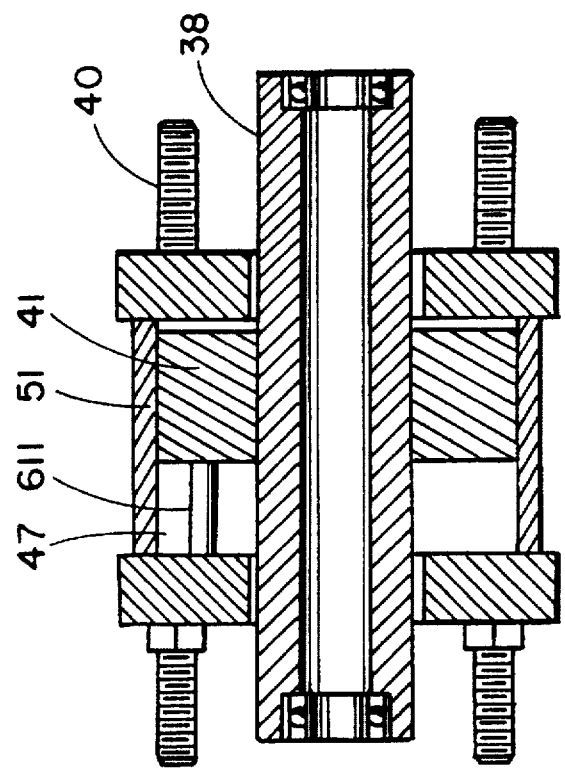
FIG. 10 includes multiple views of an anti-rotation means including a distal side view 10a and an end view 10b.
Figure 10B:
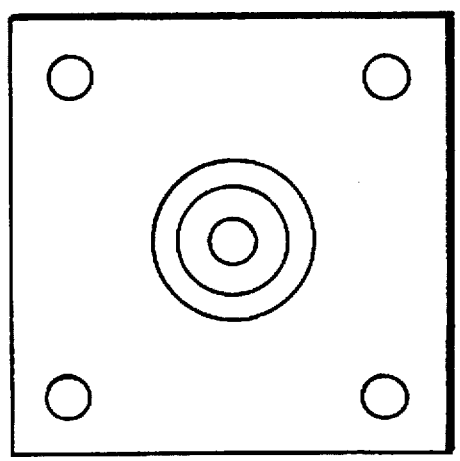

Actuator shaft 79 is rotatably coupled at its distal end to coupling sleeve 35 as described above, and at its proximal end to a workpiece 500 which, in one preferred embodiment, constitutes a fitting 7 of the general configuration illustrated in FIG. 7. A detailed view of actuator sleeve 38 including inner shaft 79 is illustrated at FIG. 9. As illustrated, shaft 79 is provided with a threaded distal end 180 and a proximal end 181 defining a head 184. Threaded distal end 180 is receivable to adapter nut 91 receivable in coupler 34. As illustrated, head 184 describes a larger diameter than shaft 79 and defines a threaded fitting chuck 187 as will be further described herein in relation to fitting 7.

In the embodiment illustrated in FIG. 7, fitting 7 includes a distal attachment end 63, a heat sink shaft 61, a fitting weld plate 60 and a bottom upset shaft 62. Attachment end 63 is preferably externally threaded to allow for quick and accurate installation of fitting 7 to chuck 187 and shaft 79. The threaded fitting top also assures concentricity for an effective friction weld. Heat sink shaft 61 allows for the dissipation of excess heat so as to protect other parts of friction weld apparatus 2. Fitting weld plate 60 permits attachment of the upset parent material so as to provide for a significantly stronger connection at the weld site than the strength of the parent material.

It is contemplated that fitting 7 may be constructed from stainless steel, e.g., a 316 stainless steel, although other metals, plastics and ceramics are also contemplated as being within the spirit of the present invention. Fitting preferably describes a bore 99 partially disposed therethrough about attachment end 63, where said bore 99 is internally threaded so as to be operative compatible with the leak sealing technique taught and described in U.S. Pat. Nos. 4,702,405 and 4,735,353.

Stationary member 550 is held in a rigid, fixed position relative to friction weld apparatus 2 and more specifically workpiece 500 by clamp assembly 8. Clamp assembly 8 comprises an upper 64 and lower 67 clamp section. Upper clamp section 64 is attachable to actuator 5 immediately adjacent logic block component 6. In one preferred embodiment, upper clamp section 64 is generally planar in configuration and defines distal 131 and proximal 133 ends as illustrated in FIG. 2. Distal end 131 is generally rectangular in cross-section and defines an axially disposed bore 132 therethrough, where said bore is preferably frustroconically shaped to accommodate proximal end or head 184 so as to define a weld containment chamber 65. Chamber 65 serves to isolate sparks and radiant heat generated during the friction weld process in combination with a spark containment molding compound and the introduction of a purge fluid as further described herein. The terminal end of chamber 65 defines a weld seal extension element 66 which serves to provide a guide for situating workpiece 500 relative to stationary member 550. As illustrated, distal end 131 is provided with a number of spaced apertures 138 to accommodate contentional threaded fasteners to secure clamp section 64 to actuator 5.

The proximal end 133 of upper clamp section 64 is generally elongate in shape with apertures 136 being provided in each of the terminal ends or wings 139 to accommodate fasteners (not shown) threaded through the lower clamp section 64 as will be further discussed below. Lower clamp section 67 is adapted to hold a variety of workpieces 550 of varying sizes and configurations, and thus acts as a universal coupler clamp. These workpieces may constitute circular valves or workpieces of enumerable other geometries. As illustrated in FIGS. 1 and 2, and more specifically in FIGS. 11A–C, lower clamp section 67 comprises a generally "U" shaped retaining arm 71 defining two terminal ends 134 and 136. In the embodiment illustrated in FIGS. 11A–C, arm 71 defines a series of linear sections connected at a 45° angle. Alternately, other configurations for arm 71, e.g., those having a circular or arcuate top section, are also envisioned within the spirit of the invention. Retaining arm 71 is preferably provided with a plurality of radically spaced apertures 70 threadedly receivable to spacing rods 141. Rods 141 may be independently threaded in apertures 70 to contact and hold a given stationary member, e.g., a valve body 550. In this connection, if member 550 is irregular in configuration, it can nevertheless be held in a selected, fixed position vis-a-vis apparatus 2 by individually moving rods 141 radially inwardly toward member 550 so as to establish a contacting relation therebetween. Once lower section 67 is placed around valve body 550, it is then secured to upper clamp section 64 via fasteners (not shown) receivable in threaded apertures 143 formed in the terminal ends of retaining arm 130.

The operation of the various steps of the friction weld process conducted by the present invention and the actuation of the various components constituting such process is governed by control means 200. As illustrated in FIG. 1, line 300 is connectable to control means 200 at its outlet end via fluidic pneumatic embedded feedback line coupling element 18. Coupling element 18 serves to couple the embedded fluidic pneumatic logic input feedback line 26 and the embedded fluidic pneumatic air motor pressure input feedback line 25 without interference from normal air flow from drive means 3. Further, coupling element 18 isolates both signals and permits bringing the fluidic input signals into drive means housing 13, and, ultimately, through various pressure lines to the fluidic pneumatic logic system 17 via transducer 14 as will be described below and as is illustrated in the schematic diagram presented at FIG. 12.

Line 300 is comprised of a number of components including fluidic pneumatic control coupling line 24, embedded fluidic pneumatic air motor pressure input feedback line 25, embedded fluidic pneumatic logic input feedback line 26 and coupling element 27. Coupling line 24 houses both a pressurized air conduit as well as control and sensing elements which are operatively coupled to coupling element 18. Coupling line 24 is coupled to both ends of coupling element 27, thereby providing for fluidic connection between logic component 6 and control means 200. Feedback line 25 is internally disposed within coupling line 24 in a coaxial relationship therebetween and provides a means for transmitting pressure information from drive means inlet 150 to a pressure gauge 23 via coupling element 18. Feedback line 26 is also internally disposed within coupling line 24 and operates to transmit signals from transducer 52 to transducer 14 via coupling element 18. Line 300 is provided at one end with a coupling 'T' element 28, which element 28 provides for isolation from the pressurized energy air flow from critical control signals while permitting control air flow to logic component 6.

Control means 200 is coupled at its inlet end to an air supply 600, preferably a plant air supply, via air supply line 400 and quick disconnect coupling 10. In a preferred embodiment, coupling 10 includes a mechanical valve 12 which permits manual shut-off of the air supply. As earlier described, control means 200 is coupled to drive means 3 and actuator 5 by a coupling line 300 which preferably includes both an air supply conduit as well as control feedback lines so as to provide for remote operation of the friction welding apparatus 2 by the operator.

Control means 200 is contained within a free-standing housing 13 which in one embodiment may include a sleeve 13A and two end plates, 13B and 13C. In the illustrated embodiment, end plates 13B and 13C provide for connection for the various fittings which facilitate the pneumatics and fluidic energy and control functions as will be described below. Control means 200 generally includes a fluidic-pneumatic multi-port control transducer 14, pneumatic-mechanical logic system 17, for example an Aroflex 6 unit, pilot pressure actuated pneumatic valve 19, for example a Skinner valve, and volume couplers 20. Transducer 14 permits the acceptance of pneumatic signals from logic block 6 to reset and shut down friction weld apparatus 2, including, but not limited to signals for an "And/Or Control Function"; emergency shut down by means of input from the mechanical valve 16, shut down by means of input from time out volume couplers 20 and/or an input from transducer 52.

Control means 200 also preferably includes a fluidic-pneumatic mechanical logic system 17. Logic system 17 performs a number of logic functions including, but not limited to, controlling the pilot pressure actuated pneumatic valve 19 as will be further described below. Logic system 17 also accepts various inputs from the transducer 14 as well as performing timing functions for the "controlled time-out devices". The term "controlled time-out" as used herein is a preset time greater than the maximum time ordinarily required to complete a weld utilizing a friction weld process. The logic system 17 provides for control of the energy to the isolated components of the system 2. Valve 19 provides air to air motor 4 as well as logic component 6. Valve 19 is adapted to specifically conform to the flow and response requirement to create a friction weld between workpiece 500 and member 550. Emergency time out valve couplers 20 are also located within housing 13 and function to provide for timed shut off control of the energy to the isolated components of the system 2. In a preferred embodiment, couplers 20 are adapted to match the flow characteristics of logic system 17.

Control means 200 also includes a mechanical-pneumatic actuator means and valve 15 and emergency deactivation means and valve 16. Valve 15 is located in housing 13 and is operator controlled to begin the automatic friction welding process. When engaged, valve 15 sends a pneumatic signal to fluidic-pneumatic system 17. Valve 16 is also located in housing 13 and is also operator controlled. When actuated, a pneumatic signal is sent to the fluid-pneumatic logic system 17, thereby shutting down the welding operation. In a preferred embodiment, control means 200 also includes a pressure gauge 23 which permits the operator to monitor fluid pressure at inlet 31 subsequent to the opening of valve 12. Gauge 23 is operatively coupled to embedded fluidic pneumatic air motor pressure feedback line 25 which in turn is coupled to coupled element 18.

Figure 12:
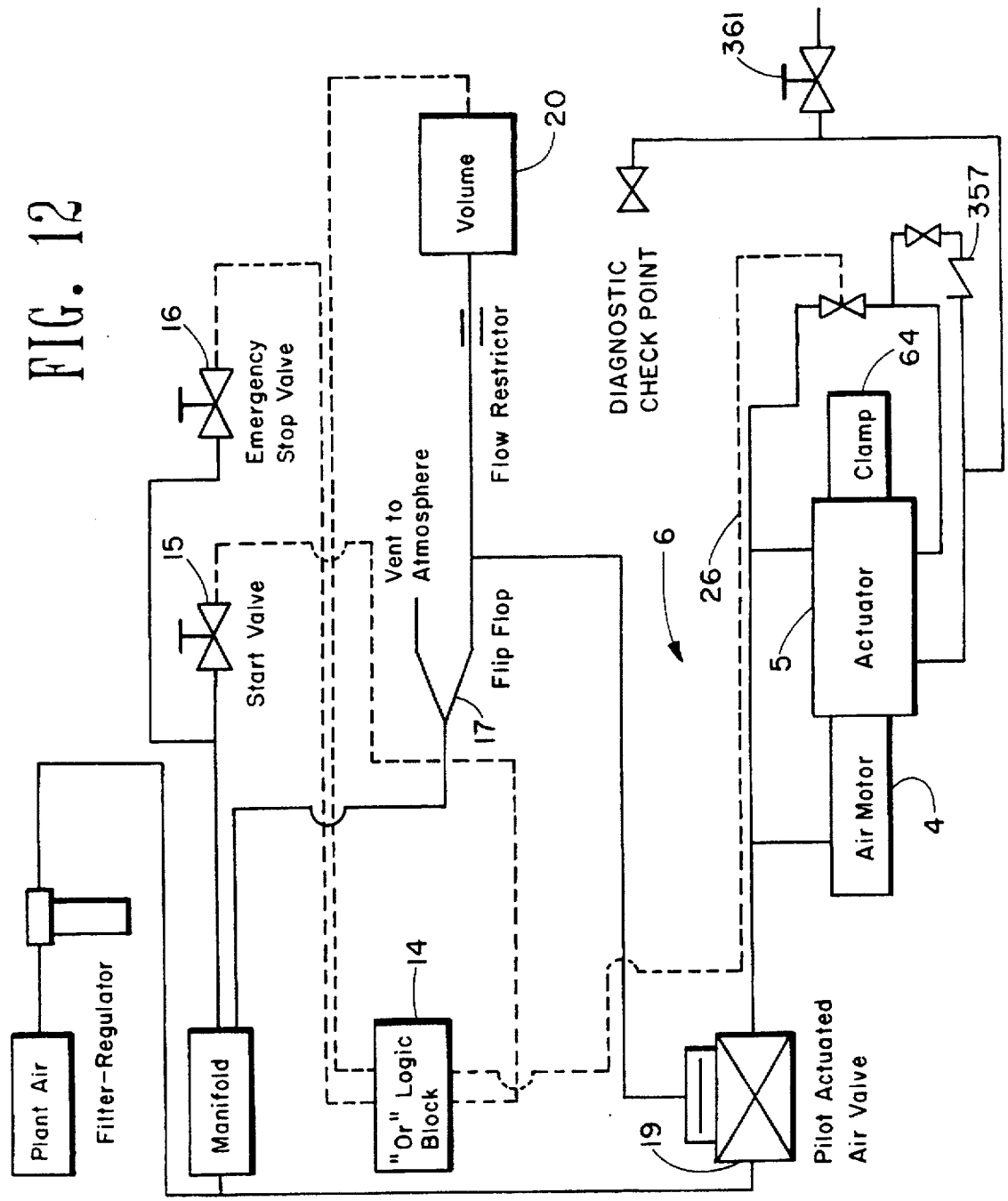
FIG. 12 is a schematic view of the control system of the present invention.

The interaction of control means 200, logic block 6, and other components in the relative interaction may be reviewed by reference to FIG. 12.

As will be described in more detail below, plant air is provided to apparatus 2 via plant air compressors which distribute air at around 90 psi. This compressed air source is coupled to control panel 13 via couplers 10, 11 and 12 as above-described. Filtered plant air is carried through tubing 22 to start valve 15 and stop valve 16. Air from valve 15 is transmitted to a flip-flop which constitutes a component of logic system 17. The flip-flop is also known as a by-stable control element which when actuated creates a signal from a preset port. When an input signal is observed, the normal actuated signal is terminated and a signal is switched to another port. A pressure signal at a reset port will switch the flip-flop back to its original "on" port.

In the event of a manual emergency shut-down, air from stop valve 16 is transmitted to "or" logic block transducer 14. Transducer 14 serves as a multi-port transducer to accept several air signals to reset the flip-flop as the system dictates.

A signal from the emergency "time out" system is received from volume chamber 20 in the event of a system shut-down failure. This "time out" system is comprised of logic system 17 and volume chamber 20.

The signal from "or" logic block transducer 14 is transmitted to the flip-flop located in system 17 either by sensor 48, emergency stop valve 16 or the emergency "time out" system. The flip-flop located in logic system 17 is a pneumatic device energized by plant air at port 14.

An air pressure signal from start valve 15 to flip-flop set port 16 located in system 17 initiates the system. Reset and system shut-down is obtained by an air pressure signal from valve 16 to the flip-flop port located in system 17. When the system is shut down, air is vented to the atmosphere through the flip-flop normally on the port located in system 17.

An air pressure signal from the flip-flop initiates the emergency timer located in system 17 comprised of flow restrictor and volume chamber 20 and opens the main high flow pilot actuated valve 19. The flow restrictor is located in system 17 and is adjustable for setting various times to shut down the system 2.

Air flow from the flip-flop located in system 17 exists through the normally "off" port 18, and rechannels air to the pressure port of valve 19. Valve 19 then receives high pressure air from internal air line 23.

Air line 300 carries air to air motor 4 and logic block 6. Air is fed to "or" logic transducer 14 through embedded air line 26. Air motor 4 is powered until shut-off by sensor 48 through an input to the reset port of the flip-flop located in system 17 via transducer 52, quick coupling element 54, embedded sensing line 26 and "or" logic transducer 14. Air motor 4 uses plant air at a nominal value of 90 psi and approximately 100 cubic feet per minute.

Fluidic transducer 52 separates sensor 48 pressure from feedback line 26 signal and essentially constitutes a venturi effect with high pressure recovery and low sensor feedback pressure. However, when sensor 48 is blocked, e.g., by cylinder 41, the venturi effect is disrupted and feedback line 26 becomes pressurized and sends a high pressure signal back through embedded air line 26 to the "or" logic transducer 14 where a signal is sent to reset the flip-flop in logic system 17 to shut down the system by removing positive pressure from pilot actuated valve.

From the time air motor 4 is initiated the pressure to chamber 47 is gradually increased over time to provide first a zero and then an increasing forging pressure until a maximum forging pressure is obtained and locked in by valve 357. Check valve 357 as located in logic block 6 is effective in maintaining forging pressures until a reasonable cool-down of the weld is achieved. Valve 359 is used to manually relieve the forging pressure at a selected and predetermined time. Alternatively, forging pressure may be automatically relieved via a fluidic timer.

As illustrated in FIG. 12, it is desirable in a preferred embodiment to include means to run a system check or diagnostic on apparatus 2. This may be accomplished by a monitoring of system air pressure through a port disposed in actuator 5 or upper support 64.

The operation and use of the welding apparatus of the present invention may be described as follows. In the instance where a leaking valve has been located, actuator 6 is coupled to the valve body 550 via clamp component 8. This is accomplished by placing lower element 67 around the valve body 550 and then securing element 67 to upper element 64 via fasteners threaded in apertures 136 and 143 as previously described. Body 550 is now locked within component 8 yet is still moveable in three dimensions. Body 550 is immovably secured with respect to actuator 6 by selective movement of rods 141 through apertures 70 until valve body 550 is fixed in a desired location via workpiece 500 and 64.

The friction weld apparatus 2 is then coupled to a plant air source via coupling line 400. Plant air is supplied to the system after opening valve 12 to permit regulated plant air to enter the system through supply line 400. Plant air is normally regulated to 80 to 100 pounds per square inch and is prefiltered to remove debris and water.

In initiating the friction welding operation, the operator first determines that desired plant air pressure and flow capability are insured by reference to a regulator pressure gauge (not shown). The operator then depresses the mechanical-pneumatic start button and valve 15 which introduces a pneumatic control signal to logic system 17. System 17, having received the "start" signal, then commands valve 19 to open and to send air flow to various parts of the system including internal parts of logic system 17 through line 300. Logic elements 17 initiate several operations including, but not limited to, activating stop button and valve 16, activating an internal timer for the emergency time-out volume coupler 20, activating the internal re-set port where the system can be shut down by couplers 20, valve 16 or sensing element 49. All three of the system "shut-down" elements, couplers 20, stop button or valve 16 and sensing element 48, are operatively coupled via a series of "or" type elements which process control information from any or all of the input.

Coupling line 300 permits pressurized air from passing through valve 19 to enter air motor 4 through inlet 30 and coupling 29. Pressure level information at inlet 31 is fed back to pressure gauge 23 through pressure lines embedded in line 300. Additionally, pressurized air is sent to logic block component 6 via the fluidic pneumatic embedded feedback line coupling element 28 located in coupling "T" element 27.

Clamp 8 is purged with pressurized air via purge passageway 58 which is located in upper clamp section 64 in weld containment chamber 65. Air introduced through passageway 58 in this fashion serves to keep explosive gas out of the area immediately proximate the contact point between 500 and 550 so as to prevent possible detonation by heat or sparks.

Workpiece 500 is snugged against member 550 by introducing air through air inlet 42. When workpiece 500 and valve body 550 are in contacting relation, a spark retardant, e.g., an inflammable molding compound (not shown) is placed around workpiece 550 to prevent sparks generated during the friction weld process. Molding compound may be made from a high temperature pliable material, e.g., a synthetic clay, and provides for a positive seal for the purge gas which then provides a positive pressure in weld containment chamber 65 for purposes of safety.

Upon the introduction of pressurized air, air motor 4 commences rotational motion. Once air motor 4 is actuated at a optimum operational speed, pressurized air is directed to logic block component 6 via quick coupling element 54, pressurization lines 56 and by means of discrete fluidic logic passageways 57 to the actuator fluidic pneumatic pressure modulation forging control system 55, fluidic sensing element 48, clamp weld chamber purge port 49, purge passage 355 and positive purge passageway 58.

The control system located in logic block component 6 then actuates forging control system 55 and transducer 52. Forging control system 55 controls the axial movement of actuator cylinder 41 which, as noted, provides the axial force required to develop forging forces and discretely increases the forging pressure over a given time period by air flow into inlet 42. This control method permits initial torque in the friction welding process to remain at a low level until the process has been initiated and the "dry" friction welding forces drop to a zero value.

As the welding process proceeds, the terminal end 62 of component 7 becomes upset and reduces in size, thereby permitting cylinder 41 and shaft 38 to move forward in an axial direction. At a predetermined point at which component 7 will become welded to the substrate of valve body 550, fluid sensing element signals transducer 52 via line 26, coupling element 28, coupling element 54, transducer 14 and logic system 17, at which time control system 200 commands valve 19 to close and shut off all pressurized air flow to the system. In a preferred embodiment, valve 19 provides for a selective time delay in shutting down to assure optimum weld completion. At this point in the process, forging pressure is maintained at its maximum level on cylinder 41 to again assure optimum forging of component 7 during the post-weld cool-down period. It is contemplated that a weld may be completed utilizing the above-described process in some thirty seconds with a cool-down period of some sixty seconds.

During the shutdown period, pressurized air flow is discontinued thereby resulting in a return of the purge pressure through port 49 to ambient conditions. After a delay, e.g., sixty seconds, the forging pressure induced behind cylinder 41 is released either via pressure relief valve 53 (not shown), a controlled timer or other method. Once forging pressure has been reduced, actuator shaft 38 may be manually retracted, or retracted by use of air motor 4 or alternately, by disconnecting air motor 4 via coupling 29 and de-spinning shaft with coupler nut 37.

As evident from the above description, the friction weld apparatus of the present invention is operable without operator intervention during the weld cycle. In this connection, the entire control of the tool is automatic to give single step actuation for the weld cycle.

Although particular detailed embodiments of the apparatus and method have been described herein, it should be understood that the invention is not restricted to the details of the preferred embodiment. Many changes in design, composition, configuration and dimensions are possible without departing from the spirit and scope of the instant invention.

What is claimed is:

1. A method of friction welding a first workpiece to a second workpiece, the process being characterized by the steps of:

securing said second workpiece in a fixed, nonrotating relationship relative to said first workpiece;

placing the first workpiece in a contacting relationship relative to the second workpiece so as to create a first selected contact pressure therebetween;

establishing a weld containment chamber around said first workpiece;

rotating said first workpiece at a selected speed relative to said second workpiece so as to induce a burn-off phase and an upset phase while simultaneously maintaining positive fluid pressure within said chamber;

gradually increasing a forging pressure between said first workpiece and said second workpiece to a second selected contact pressure; and terminating rotation of said first workpiece relative to said second workpiece.

2. The method of claim 1 further including the step of modifying the axial contacting force between the first workpiece and the second workpiece to a third selected pressure where said pressure is sufficient to fuse said first workpiece to said second workpiece after said step of terminating rotation of said first workpiece.

* * * * *